United States Patent [19]

DeVittorio

[11] 4,106,964

[45] Aug. 15, 1978

[54] BALANCE CORRECTION METHOD AND APPARATUS

[75] Inventor: Joseph M. DeVittorio, Indianapolis, Ind.

[73] Assignee: Ransburg Corporation, Indianapolis, Ind.

[21] Appl. No.: 695,210

[22] Filed: Jun. 11, 1976

[51] Int. Cl.² ............................................. G01M 1/00
[52] U.S. Cl. .................................... 156/75; 118/302; 118/306; 118/317; 301/5 B; 427/233; 427/348
[58] Field of Search ............... 156/75, 95, 125, 128 U, 156/242, 244, 307, 308, 378; 157/1, 13; 51/106, 161, DIG.33; 301/5 B, 5 BA; 152/330 R, 347; 118/300, 302, 306, 317, 323; 427/233, 236, 348

[56] References Cited

U.S. PATENT DOCUMENTS

| | | | |
|---|---|---|---|
| 1,861,475 | 6/1932 | Hopkins et al. | 118/300 |
| 2,193,734 | 3/1940 | MacCracken | 156/75 |
| 2,583,220 | 1/1952 | Lanigan | 427/348 |
| 2,873,790 | 2/1959 | Cadwell et al. | 156/125 |
| 3,049,439 | 8/1962 | Coffman | 118/300 |
| 3,085,924 | 4/1963 | Nichols | 156/75 |
| 3,231,415 | 1/1966 | Grenley et al. | 427/348 |
| 3,348,774 | 10/1967 | Wiggins | 118/302 |
| 3,463,551 | 8/1969 | Clay | 152/330 |
| 3,725,163 | 4/1973 | Hofelt | 156/75 |
| 3,987,833 | 10/1976 | Powell et al. | 156/75 |

*Primary Examiner*—John E. Kittle
*Attorney, Agent, or Firm*—Merrill N. Johnson; Richard D. Conard

[57] ABSTRACT

A method and apparatus for correcting imbalance occurring in pneumatic tires during their manufacture. Correction is made by depositing on the inside surface of the tire, at a balance-correcting position, a measured quantity of an uncured, quick-curing, urethane or other liquid elastomer composition which bonds to such surface when cured, and curing the composition in place against the surface. The surface is cleaned in advance, as by washing, scrubbing, and/or abrading, to remove mold release agents and the like and to expose the bare rubber of the tire wall for bonding. The elastomer is desirably deposited in a pool, but may be dispensed in a stream of air or other gas directed toward the deposit. The air reduces the thickness of the pool and feathers its edges and thereby reduces the discontinuity between the deposited material and the tire surface, and promotes bonding. The elastomer composition is mixed in a dispensing head having a mixing chamber to which elastomer components are metered in predetermined proportions, and its quantity is controlled by time. The composition is dispensed from the head through a nozzle. After the elastomer is deposited, the head is separated from the tire and then rinsed with solvent and dried with gas to prepare it for a subsequent operation. Control of tire handling and preparation, metering of components, and operation of the dispensing head may be partially or largely automatic in response to previously recorded tire imbalance information.

20 Claims, 8 Drawing Figures

BALANCE CORRECTION METHOD AND APPARATUS

My invention corrects the imbalance occurring in rotating elements. It is especially applicable and useful to correct imbalance occurring in pneumatic tires during their manufacture.

Passenger car and truck tires are manufactured with the intention that their mass will be symmetrically disposed about their axes of rotation so that the tires will be balanced, but manufactured tires are often so far out of balance that they cannot be used without further work to correct the imbalance. This problem is especially acute with steel-belted radial tires which are difficult to build and expensive, and reject ratios of 10% or more are not uncommon.

Present methods of correcting the imbalance of manufactured tires are expensive, unreliable, and labor intensive. Typically, a skilled workman determines the amount of imbalance and hand marks the point of imbalance. The workman then spreads the walls of the tire and with hand and/or power tools physically abrades and roughens the interior surface of the tire over an extended area, for example, about ten square inches, at the location of the imbalance. Then, using a brush he coats the abraded surface with a liquid adhesive. He then applies a calibrated rubber patch of a selected weight to the abraded and coated surface. The rubber patches are prepared in advance usually in various sizes in increments of one-half ounce. Hand-operated rollers and the like are used to affix the rubber patch to the interior surface of the tire. Such patches are not secure and may become partially or totally separated as the tire is driven due to heat, physical deformations, and other causes, and such possibility of separation is sufficiently great that patched tires are usually sold at reduced prices although they cost more to make than unpatched tires.

It is the principal object of the present invention to provide an improved method and apparatus for correcting rotational imbalance occurring in rotating elements, and especially for correcting imbalance occurring during the manufacture of pneumatic tires so that the mass of the tire is substantially evenly distributed about its axis of rotation. It is a further object of the invention to provide means to add mass at balance-correcting locations, to tightly bond the added material to the tire so that it will not separate, to permit infinite variation over a wide range of the added material, and to distribute the added mass over a desirable area which may extend over an arc of the tire. It is a further object of the invention to provide apparatus which will prepare and dispense accurate quantities of correcting substance and will provide for convenient application of such substance adjacent the point of imbalance.

By "point of imbalance," is meant the angular position about the tire at which the addition of a suitable mass of correcting substance will overcome the imbalance and bring the tire to a balance condition. By "balance-correcting position," is meant the position at or adjacent the point of imbalance where the addition of mass will partially or wholly correct the imbalance. In practice, the added mass of correcting substance will necessarily be distributed over an area adjacent the point of imbalance, and in a tire such distribution is desirable to avoid excess thickening of the flexible tire wall and avoid the creation of stress concentration points in such wall. As a practical matter, it is to be recognized that the tire will be mounted on a supporting rim and wheel, and that in the final analysis it is the balance of the entire assembly which is important. Accordingly, practical considerations permit some leeway in the exact placement and distribution of the mass of tire-correcting substance added to the unmounted tire.

In accordance with the present invention, the interior surface of an unbalanced tire at and adjacent the point of imbalance is first prepared to receive a correcting deposit, as by cleaning to expose the bare rubber of the tire wall. A deposit is then made onto the prepared surface of a measured quantity, in liquid state, of an uncured, quick-curing plastics composition which will bond to the tire surface as it cures. For use in tires, the plastics composition is desirably an elastomer having chemical and physical characteristics compatible with the tire material and operating conditions. The deposit may be made by gravity flow to form a pool of liquid composition on the tire surface, or may be made with the use of an air stream to distribute the deposited liquid and feather the edges of the pool, which reduces the discontinuity between the deposit area and the adjacent tire wall and promotes bonding of the deposited material to the wall. The deposit may be made at a single location adjacent the point of imbalance or may be made at spaced points over a larger area, for example, over an arc of the inner surface of the tire. The deposited composition is normally sufficiently viscous and adherent to permit the tire to be removed promptly from association with the depositing equipment and to a holding rack where cure of the deposited material will be completed. The deposited material is cured in place against the surface of the tire wall and becomes bonded thereto during such cure.

The plastics composition is desirably deposited from a dispensing head containing a mixing chamber to which the components of the composition are metered in fixed proportions at a predetermined rate, so that the quantity of composition is controlled by time. The components are mixed as by a mixing impeller, and discharged from a dispensing nozzle. When the composition is deposited by gravity flow, the nozzle may comprise an open port from which the composition flows. When the deposit is to be made with an air stream, an air discharge orifice is formed about or adjacent the composition discharge port. To facilitate deposition of the correcting substance over a desired area, the dispensing head may be mounted for movement relative to the tire, for example angularly in the plane of the tire.

The dispensing head is connected to suitable supply equipment for supplying the components of the plastics composition. This will normally include supply circuits for a basic polymer and for an activator or catalyst which combines with the polymer to form the plastics composition. Desirably, the supply systems continuously recirculate the components at controlled pressures and include valves to divert the flows to the dispensing head through metering passages, so that the component proportions are controlled by the pressures and metering passage sizes. This permits the quantity of composition mixed in the mixing chamber and dispensed from the head to be controlled by controlling the time during which the valves in the two circuits deliver components to the mixing chamber. After each dispensing operation the mixing chamber and nozzle are desirably flushed with solvent and then purged with air.

Preparation of the tire surface to receive the deposit of plastics composition is desirably sufficient to remove all parting compounds and the like from the tire surface and expose the bare rubber of the tire wall for bonding. The required preparation steps will depend upon the nature of such parting compounds and the like present on that surface. If such agents are soluble, it may be sufficient simply to wash or scrub the surface with a suitable solvent. Where this is not sufficient, the surface may be brushed or otherwise abraded to provide a suitable bonding surface.

The plastics composition used in any particular application is selected to suit the nature and characteristics of the surface and part onto which it is to be deposited. Preferably, the plastics composition should be one which can be deposited in viscous liquid state, which is quick-curing, and which will securely bond to the surface of the part as it cures. For use in pneumatic tires, the plastics composition is desirably an elastomer which will securely bond to the rubber of the tire wall, will withstand the operating conditions of a pneumatic tire, such as the continuous flexing and heating and other conditions of tire operation. Those skilled in the plastics art can readily select the elastomer to be used in any particular application.

For correcting imbalance in currently conventional passenger and truck tires, it is especially desirable to use a liquid polyurethane composition, for example, the liquid urethane polymer available commercially from E. I. DuPont de Nemours and Co., Inc. under the mark "ADIPRENE L-100" and to combine this with a suitable catalyst, such as a eutectic mixture of M-phenylene diamine and cumene diamine, together with a reaction control component such as dioctyle phthalate in an amount to give a cure time of 30 to 40 seconds.

BRIEF DESCRIPTION OF THE DRAWINGS

The accompanying drawings illustrate the invention, and show a specific embodiment exemplifying the best mode presently contemplated by the inventor for carrying out his invention. In such drawing.

DETAILED DESCRIPTION OF THE PREFERRED EMBODIMENT

Figure 1:
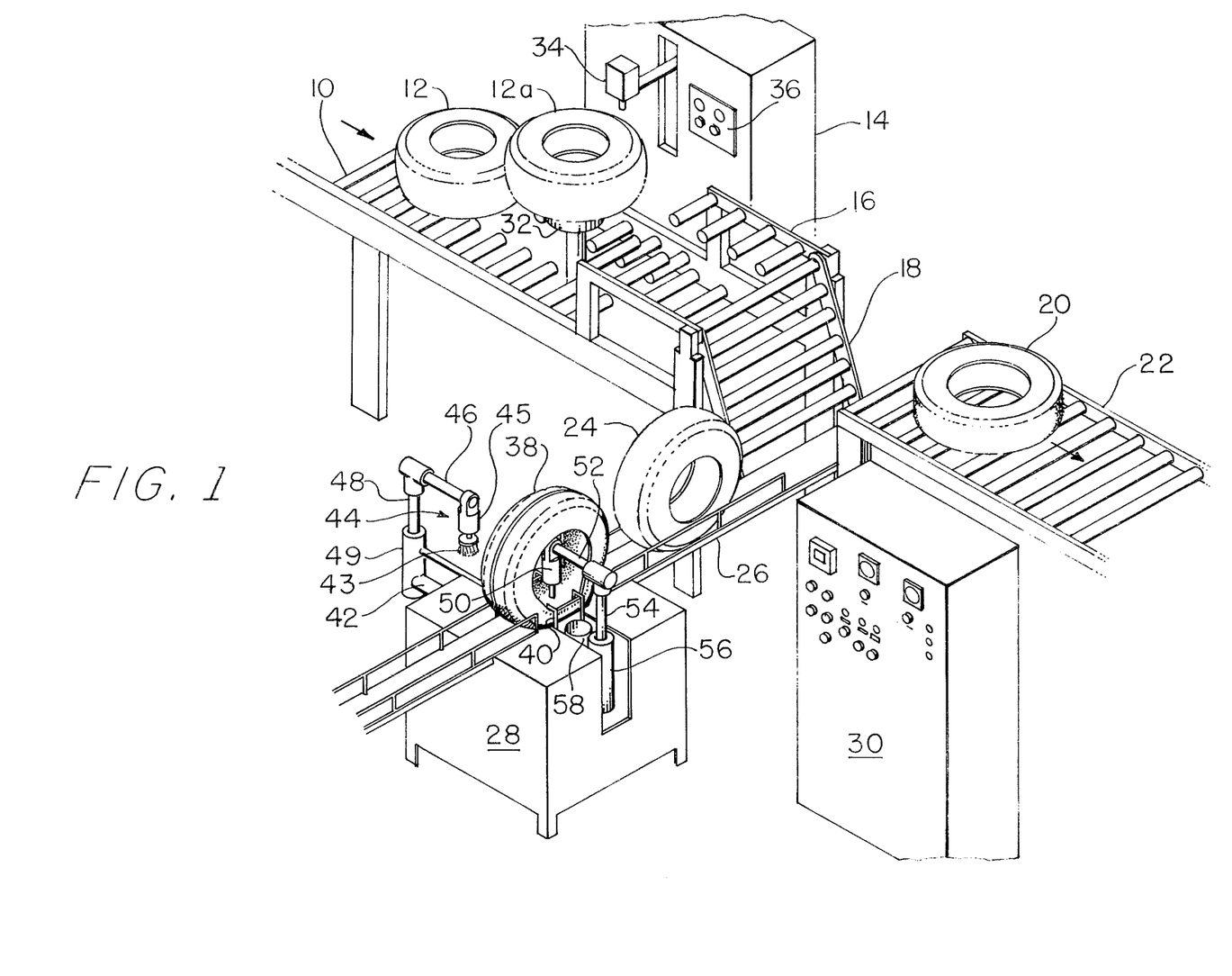
FIG. 1 is a somewhat diagrammatic perspective view of apparatus which may be used for balancing and correcting the imbalance of pneumatic tires in accordance with the invention.

The apparatus shown in FIG. 1 comprises a conveyor 10 for conveying tires 12 to a balance testing machine 14. A receiving conveyor 16 carries tested tires to a gate 18 which has a normally raised position (not shown) for conveying acceptably balanced tires 20 to a delivery conveyor 22, and has a lowered position (shown) for delivering unbalanced tires 24 to a runway 26 leading to a balance correcting machine 28. The balance correcting machine is controlled by control mechanism in a control housing 30.

The balance testing machine 14 may be a conventional machine such as model 1060-WSO Tire and Wheel Balancing Machine manufactured by Micro-Poise Engineering, 51300 Pontiac Trial, Wixom, Mich. 48096. The machine shown includes a balancing head 32 which supports a tire in a balancing position such as that of the tire 12a. The machine determines whether the balance of the tire 12a is within acceptable limits. If so, the machine actuates control mechanism which lifts the gate 18 to its raised position so as to deliver the tire to the delivery conveyor 22. If the tire balance is not within acceptable limits, the machine determines the amount and position of imbalance. It has a marker device 34 which marks on the tire the angular position of imbalance, that is, the angular position at which mass should be added to the tire to bring it into balance. The amount of imbalance, that is, the amount of mass required to be added at that position to bring the tire into balance is suitably recorded, as by display on a display panel 36 observable by the operator of the balance correcting machine. The machine also actuates the gate 18 to its lowered position as shown and delivers the unbalanced tire to the runway 26 and thence to the balance correcting machine 28.

The balance correcting machine 28 comprises a platen (not shown) for supporting a tire 38 to be balanced, and tire spreader hooks 40 for spreading the beads of such tire. A shuttle carriage 42 is mounted for movement transversely below the platen. One end of such carriage supports a cleaning device 44 for preparing the surface of a tire 38 to receive a deposit of balance correcting substance. Conveniently, the cleaning device is mounted for angular movement about a supporting arm 46 which is pivoted at the upper end of a vertical rod 48, desirably the piston rod of a hydraulic cylinder 49 by which the whole assembly may be raised and lowered.

The opposite end of the carriage 42 carries a dispensing head 50. This is desirably supported for angular movement about the axis of a bracket 52 carried at the upper end of rod 54 forming the piston rod of a hydraulic cylinder 56 by which the assembly may be raised and lowered.

The carriage 42 is shown in a dispensing position in which it locates the dispensing head 50 midway between the beads of the tire 38 and locates the cleaning device 44 outside and well spaced from the tire 38. The carriage has a centered position in which both the cleaning device 44 and the dispensing head 50 lie beyond the sides of the tire, so as to permit the tire to be rolled to correcting position on the platen and removed therefrom. In this centered position, the dispensing head 50 is disposed over a waste receptacle 58 to which flushing solvent may be discharged from the dispensing head.

The nature of the cleaning device 44 will depend upon the cleaning operation which needs to be done on the tires being balanced. If a simple washing is sufficient, such cleaning device may include a wash liquid dispenser and a vacuum head for removing the wash liquid. Where scrubbing is desired, the head may include a scrubbing brush such as a motor-driven brush having axial bristles. For convenience and for present purposes, the cleaning device 44 is assumed to be a depending brush 43 driven by an air or electric motor 45.

In the operation of the balance-correcting apparatus shown in FIG. 1, an imbalanced tire is placed on the platen of the correction machine 28 in the position of the tire 38, and its side walls are spread and it is secured in place with the bead spreading hooks 40. The carriage 42 is then moved to bring the cleaning device 42 into position between the beads of the tire 38, and the cleaning device is lowered and operated to clean the exposed inner surface of the tire 38 at the bottom of such tire. When the cleaning operation is completed, the cleaning device is lifted and the carriage 42 moved to the position shown, where the dispensing head 50 is disposed over the cleaned inner surface of the tire. An amount of correcting substance determined from the amount of imbalance displayed on the display panel 36 is then deposited on the tire 38 at a correcting position adjacent the point of imbalance. The carriage 42 is then moved to its neutral position and the tire is removed to a holding station to complete the cure of the deposited correction substance. The centered position of the carriage disposes the dispensing head 50 over the waste receptacle 58 so that the head 50 can be flushed and purged in preparation for a subsequent operation.

Figures 2, 3, 4:
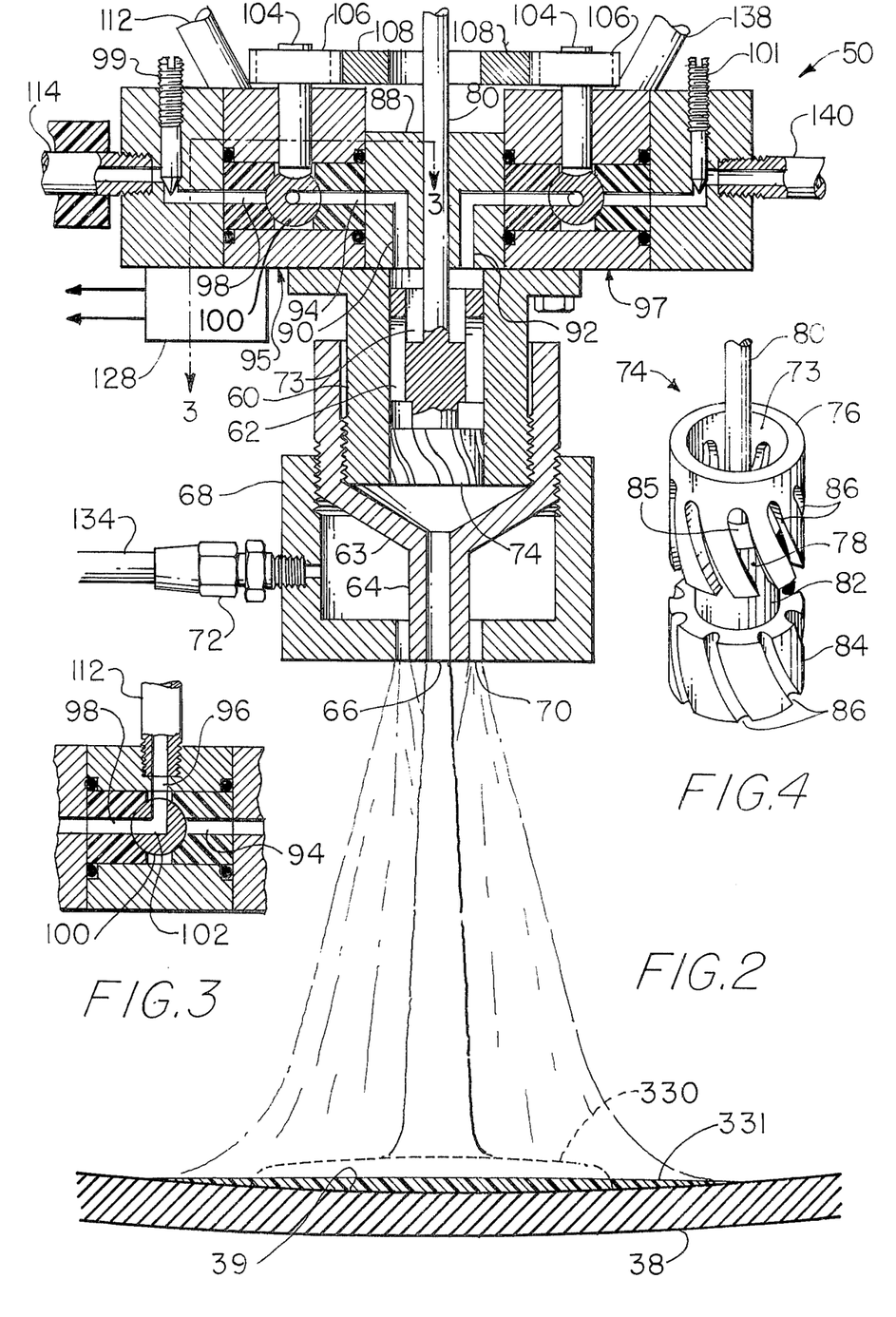
FIG. 2 is a vertical section of a dispensing head in accordance with the present invention, showing the valves in dispensing position.
FIG. 3 is a fragmental horizontal section on the line 3—3 of FIG. 2, showing a valve in recirculating position.
FIG. 4 is a perspective view of the mixing impeller used in the head of FIG. 2.

The dispensing head shown in FIG. 2 comprises a cylindrical body 60 having a vertical through bore forming a mixing chamber 62. This is closed at the bottom by a cap 63 threaded onto the outside of the body 60 and having a downward nozzle 64 containing a central dispensing passage 66. The nozzle 64 is surrounded by a shroud 68 having a cylindrical outer wall threaded onto the outside of the cap 63 and having an end wall surrounding the end of the nozzle 64 and spaced therefrom to define an annular air discharge port 70. Air is supplied to the shroud 68 through an inlet fitting 72.

Figure 5:
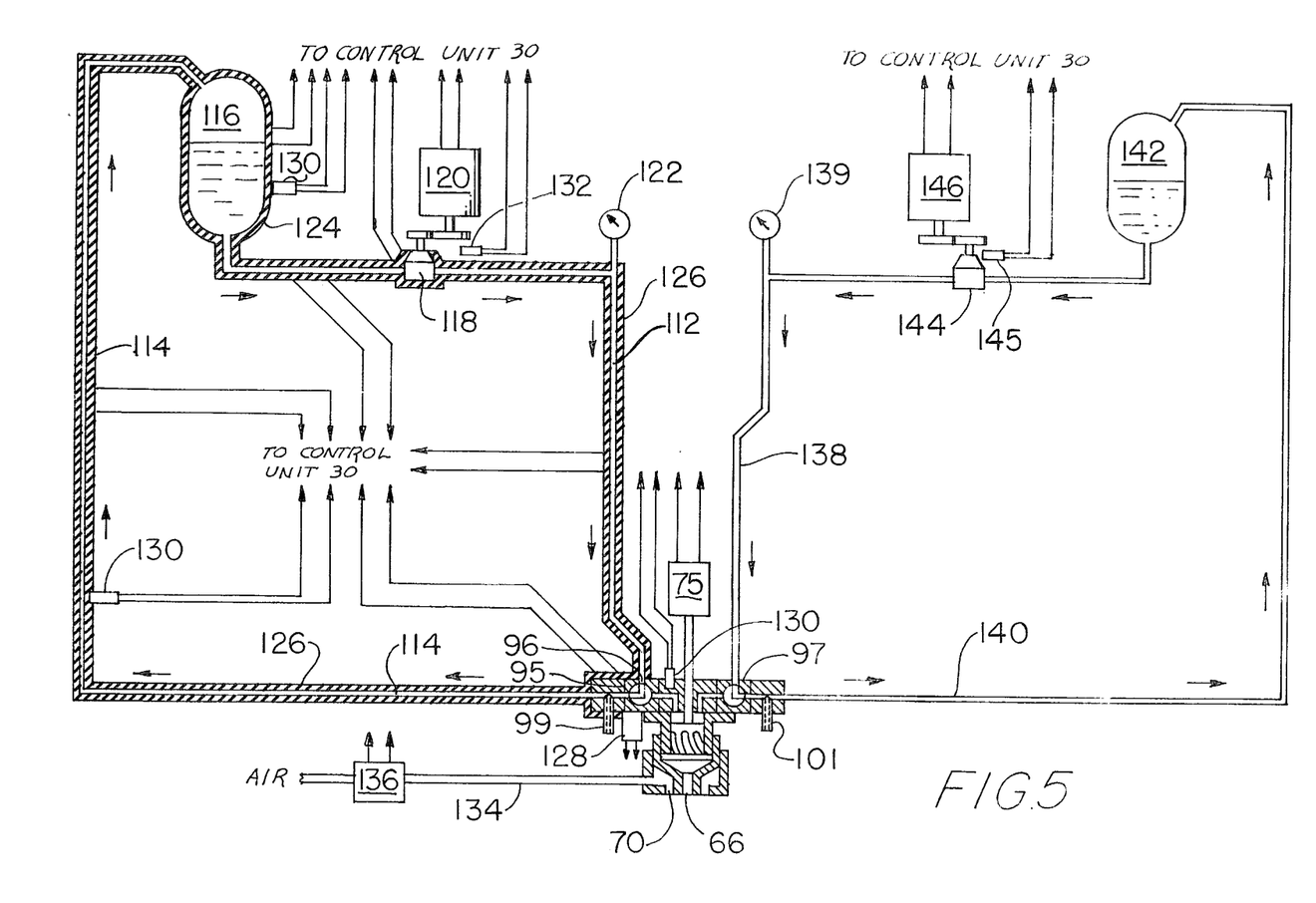
FIG. 5 is a schematic diagram of a dispensing head as shown in FIG. 2 in association with supply circuits for elastomer and activator.

The mixing chamber 62 contains an impeller 74 which is desirably as shown in FIG. 4. This is a generally cylindrical body having a recess 73 in its upper end surrounded by a cylindrical wall 76. The mid-portion of the impeller forms a hub 78 by which the impeller is mounted on a drive shaft 80 driven by a motor 75 (FIG. 5). Intermediate the length of the impeller, the cylindrical outer wall is interrupted by a circumferential groove 82, separating the upper portion from a lower portion 84. The outer wall of the impeller is formed with a circumferential series of helical grooves 86. These form slots 85 through the upper cylindrical wall 76 surrounding the recess, extend downward therefrom to the circumferential groove 82, and are continued over the lower portion 84 so that they open at the bottom of the impeller. The impeller rotates clockwise as shown in FIG. 4 and the grooves 86 are of a hand such that they tend to impel material downward in the mixing chamber 62 toward the nozzle passage 66.

The mixer housing 60 is closed at the top by a block in which the impeller shaft 80 is rotatably mounted and which contains a restricted metering passage 90 for metering polymer to the mixing chamber 62 and a second metering passage 92 for metering activator to such chamber.

The elastomer metering passage 90 is connected to the delivery port 94 of an elastomer control valve 95 which also has an inlet port 96 shown in FIG. 3 and a recirculation port 98. A ball-shaped valve rotor 100 is mounted between the ports and contains an angled valve passage 102. The rotor is rotatable through 90° to connect the inlet port 96 either to the delivery port 94 as shown in FIG. 2 or to the recirculation port 98 as shown in FIG. 3. The activator metering passage 92 is connected to an activator control valve 97 of the same construction as the valve 95 but with its rotor differently disposed. The two valves are operated by valve stems 104 having gears 106 at their upper ends engaged with oppositely disposed racks 108 on an operating slide 110 shown in FIG. 6.

The metered quantities of elastomer and activator delivered to the mixing chamber 62 from the metering passages 90 and 92 enter the recess 73 in the upper end of the impeller 74 and mixing begins at that point. The mixture passes outward from that recess 73 into the helical slots 85 and thence downward in the grooves 86 formed in the exterior of the impeller, to the circumferential groove 82. Further mixing occurs in such groove, and the mixture then passes on downward along the helical grooves 86 where it is discharged to and through the nozzle dispensing passage 66.

The elastomer valve 95 is connected to a supply circuit shown at the left in FIG. 5. The inlet port 96 of the valve is connected to a supply line 112 and its recirculation port 98 is connected to a recirculation conduit 114. Such latter connection is through a restrictor valve 99 for controlling flow rate and hence pressure in the supply line 112. The elastomer supply line 112 leads from a supply tank 116 through a positive displacement pump 118 driven by a motor 120, and is connected to a pressure gauge 122. The recirculating conduit 114 leads back to the supply tank 116. The speed of rotation of the pump 118 is sensed by a speed sensing unit 132 connected to a tachometer in the control unit 30. The air orifice 70 of the dispensing head is supplied with air through an air line 134 containing a solenoid control valve 136 controlled by the timing mechanism in the control unit 30.

The entire elastomer recirculation circuit, including the valve 95, is desirably heated to maintain the elastomer at a working viscosity. To this end, the tank is surrounded by a heater 124, the lines 112 and 114 and the pump 118 are surrounded by heaters 126, and the valve 95 is provided with a heater 128. Suitably located thermistors 130 sense the temperature in the circuit and provide feedback for controlling the heater supply circuits in the control unit 30.

The activator valve 97 is connected to a supply circuit shown at the right in FIG. 5. The inlet port of the valve is connected to a supply line 138, and its recirculation port is connected to a recirculating line 140 through a flow regulating valve 101 which controls pressure in the supply line 138 and in the valve 97. The supply line 138 leads from a tank 142 through a pump 144 driven by a motor 146, and contains a pressure gauge 139. The recirculation line 140 leads back to the supply tank 142. A speed sensing unit 145 senses the speed of the pump and is connected to a second tachometer in the control unit 30.

Figure 6:
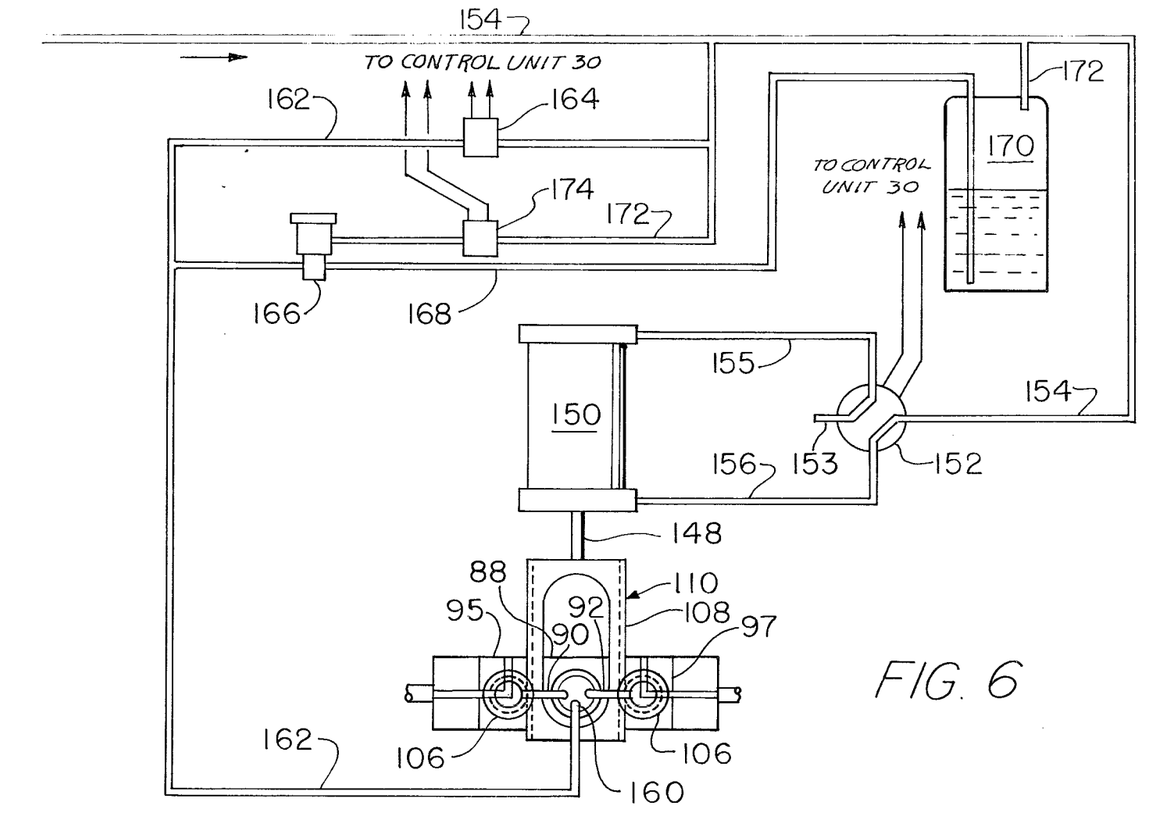
FIG. 6 is a schematic diagram showing a dispensing head of FIG. 2 associated with a pneumatic valve actuating mechanism and a head flushing and purging circuit.

The elastomer valve 95 and the activator valve 97 are actuated by mechanism shown in FIG. 6. Each valve has an operating gear 106 in mesh with a rack 108 on a slide 110. The slide 110 is actuated by the piston rod 148 of an air cylinder 150. Such cylinder 150 is controlled by a two-way solenoid valve 152 connected to an air line 154 and to feed lines 155 and 156 connected to the opposite ends of the cylinder 150. The solenoid valve 152 is controlled from the control unit 30. The valve 152 has a normal position in which it connects the bottom feed line 156 to the air line to supply air to the lower end of the cylinder 150 and connects the top feed line 155 to a vent 153. This causes that cylinder to actuate that slide 110 to its retracted position as shown in FIG. 6, in which the valves 95 and 97 are in their recirculating positions and the metering passages 90 and 92 are cut off from communication with the elastomer and activator circuits. When the solenoid valve 152 is energized, it connects the lower feed line 156 to the vent pipe 153, and connects the air supply line 154 to the upper feed line 155 so as to actuate that cylinder and drive the slide 110 forward. This rotates the valves 95 and 97 through 90° to their delivery positions as shown in FIG. 2 in which they connect the supply lines 112 and 138 to the metering passages 90 and 92 leading to the mixing chamber of the nozzle.

For purposes of flushing and cleaning the mixing chamber 62 and nozzle passage 66 of the dispensing head after each dispensing operation, the dispensing head may be connected to a flushing and cleaning circuit as shown in FIG. 6. An inlet port 160 is formed in the block 88 of the dispensing head, leading to the mixing chamber 62. This is connected by a line 162, through a normally-closed solenoid purge valve 164 to the air supply line 154. The line 162 is also connected through a normally-closed air-operated solvent valve 166 and a solvent line 168 to a solvent supply tank 170. The solvent in the tank is maintained under pressure by a pressure line 172 connected to the air supply line 154. The operating head of the solvent valve 166 is connected through an air line 172 and normally-closed solenoid valve 174 to the air supply line 154. The two solenoid valves 164 and 174 are controlled from the control unit 30.

Operation of the flushing and cleaning circuit is as follows. At the end of a dispensing operation and after the head has been separated from the tire, the solvent valve 166 is opened by air actuation in response to opening of the solenoid valve 174, and solvent from the tank 170 is allowed to flow for a predetermined time through the lines 168 and 162 to the port 160 leading to the mixing chamber 62 in the dispensing head. The solvent valve 166 is then closed, and the air purge valve 164 opened to supply air under pressure directly from the air line 154 through the air supply line 162 to the port 160. Air is thus blown through the mixing chamber 62 and impeller 74 and dispensing nozzle 64 for a sufficient time to purge such parts of solvent and leave them clean and dry, ready for a subsequent dispensing operation.

Figure 7:
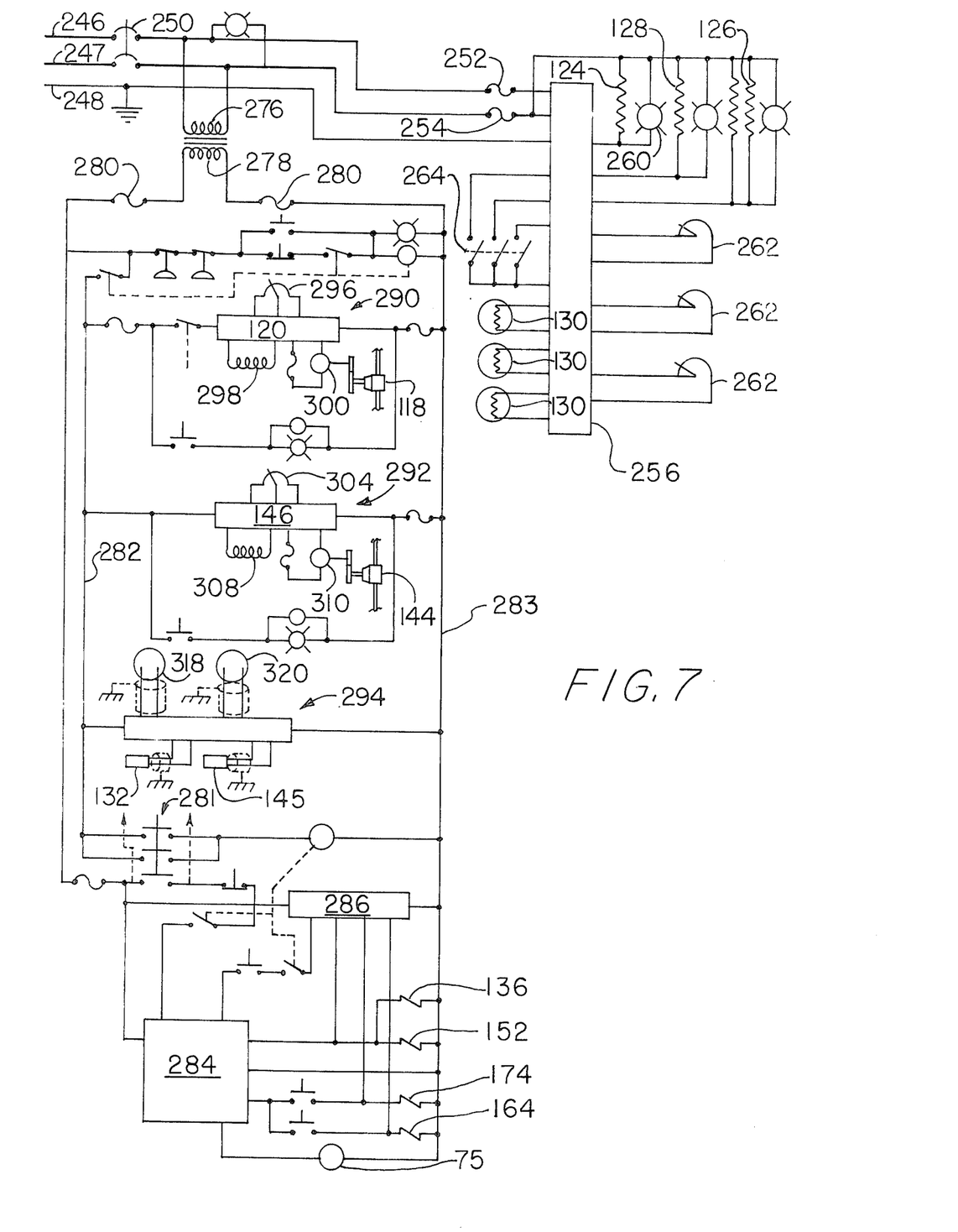
FIG. 7 is a schematic diagram of electrical circuit apparatus useful for energizing and controlling the apparatus of FIGS. 2–6.

The electrical supply and control circuitry is shown in FIG. 7. Power is supplied by a 220 volt single phase circuit comprising lines 246, 247, and 248 and containing a circuit breaker 250. The supply circuit is directly connected through fuses 252 and 254 to a heater control panel 256 having a master switch 264 and connected to the heaters 124, 126, and 128 for the elastomer tank 116, the recirculation lines 112 and 114 and the dispensing head 50. Separate indicator lamps 260 are connected across the heaters to indicate when they are energized. The heaters are controlled by separate rheostats 262 coupled to the thermistors 130, so as to maintain predetermined temperatures in the elastomer supply and recirculation circuit.

Drive and control circuitry shown in FIG. 7 is supplied with electric power from a transformer having a primary winding 276 connected across the supply lines 246 and 247, and a secondary winding 278 connected through fuses 280 and a master switch 281 to the opposite legs 282 and 283 of a drive circuit. A dispensing cycle timer 284 is connected across the transformer secondary 278 circuit and controls the solenoids of the dispensing control valve 152 (FIG. 6) and the nozzle air supply valve 136 (FIG. 5), and controls a drive circuit for the mixer motor 75. It also controls a purge timer 286 which controls the operating cycle of the solvent control valve 174 and the air purge valve 164 (FIG. 6).

An energizing circuit 290 for the elastomer pump motor 120 is connected across the drive circuit 282-283, and includes a field winding 298, an armature 300, and a speed control 296.

An energizing circuit 292 for the activator pump motor 146 is also connected across the drive circuit 282-283. The motor includes a field winding 308 and an armature 310 and is controlled by a speed control unit 304.

A tachometer circuit 294 is also connected across the line 282-283. It includes two tachometers 318 and 320 for the two pump motors, responsive to the probes 132 and 145 mounted in position to sense the speed of the two pumps 118 and 144. The readings of the tachometers permit the speed control units 296 and 304 of the pump motors to be adjusted to achieve a desired output for the elastomer pump 118 and the activator pump 144 and thus to achieve proper delivery rates and proportioning of elastomer and activator through the metering passages 90 and 92 to the mixing chamber 62. Such delivery rates are determined by the size of the metering passages 90 and 92 and by the pressures under which the elastomer and activator components of the elastomer mixture are supplied to such passages. With properly proportioned delivery rates it is then possible to control the quantity of elastomer composition mixed and dispensed by the dispensing head, by controlling the time during which the dispensing head valves 95 and 97 are positioned to deliver the components to the mixing chamber 62.

A specific example of the operation of the apparatus described above is as follows. The elastomer supply tank 116, the pump 118, and the lines 112 and 114 are filled with a liquid urethane elastomer obtained commercially from E. I. DuPont De Nemours and Co., Inc. and identified as "ADIPRENE L-100," and the tank is maintained under nitrogen gas at a pressure of one pound per square inch above atmospheric pressure. The activator tank 142, the pump 144, and the lines 138 and 140 are filled with a mixture of 6.2 parts of a eutectic mixture of N-phenylene diamine and cumene diamine as activator, together with ten parts of dioctyl phthalate to control reaction rate, and the tank 142 is maintained under nitrogen gas at a pressure of one pound per square inch above atmospheric pressure. The desired elastomer-to-activator ratio is 100 parts of elastomer to 16.2 parts of activator mixture, by weight. Such ratio is obtained by operating the elastomer pump 118 at 54 rpm and adjusting the flow regulating valve 99 to maintain a pressure of 100 psi in the circuit as registered by the gauge 122;

and by operating the activator pump 144 at a speed of 82 rpm and adjusting the flow regulating valve 101 to maintain a pressure in the activator supply line 138 of 5.5 psi as registered on the pressure gauge 139. The elastomer metering passage 90 has a diameter of 0.062 inch, and the activator metering passage 92 has a diameter of 0.018 inch. The liquid elastomer circuit is maintained at a temperature of 160° F. With these conditions in an operating system, elastomer and activator were delivered to the mixing chamber 62 in a proportion which gave an elastomer composition having a cure time of 30 to 40 seconds, and which delivered one-half ounce of such mixture from the dispensing head in 9.23 seconds.

An unbalanced tire 38 (FIG. 1) is suitably positioned on the platen of the balance correcting machine 28, with the point of imbalance at the bottom of the tire. A cleaning device such as the rotary brush 43 is positioned between the beads of the tire and is used to clean an area of the inner surface of the tire in preparation for the deposit of a tire correcting substance. Such cleaning removes the parting compounds and the like and exposes the bare rubber of the tire wall. Any dust produced by the cleaning is removed. The brush 43 is then withdrawn and dispensing head 50 is brought into position over the cleaned area of the inside tire surface, and the controls of the control unit 30 are set to give the desired dispensing cycle and to dispense a mass of balance-correcting elastomer composition sufficient to correct the tire imbalance. If substantial quantities of material were removed from the cleansed surface of the tire in cleaning, a corresponding additional mass of composition may be included to replace the removed material.

In such situation, the elastomer composition is added both to add the mass of original imbalance and to replace mass removed by the surface-preparing step. To determine the mass of material removed from the article during the preparation of the surface of the article in the vicinity of the location of imbalance, the tire to be balanced may be rechecked on machine 14 to determine the amount of imbalance existing after the surface preparation step. A mass of material then would be added to correct both the amount of original imbalance and the amount of material removed during the surface-preparation step.

The dispensing cycle is as follows:

A. In standby or ready condition, the pumps 118 and 144 are operating and the dispensing head valves 95 and 97 are in recirculating position shown in FIGS. 3 and 5, so that liquid elastomer and activator are being continuously recirculated in their respective supply circuits.

B. For dispensing, the cycle controller 284 is preset to open the dispensing head valves 95 and 97 for a time which will dispense the desired quantity of elastomer composition, in the ratio of 9.32 seconds per one-half ounce of composition. Thus, if a one ounce deposit is desired, the timer is set to open the valves for a period of 18.64 seconds. Dispensing is then initiated. The mixer impeller 74 is driven at 3500 rpm. The controlling air valve 152 (FIG. 5) is actuated to cause the air cylinder 150 to operate the slide 110 and rotate the valve balls of the valves 95 and 97 to their dispensing positions as shown in FIG. 2. Elastomer and activator are then delivered in predetermined proportions to the mixing chamber 62 through the metering passages 90 and 92.

The composition components are partially mixed in the recess 73 at the upper end of the mixer-impeller 74, and then pass outward through the slots 85 into the helical grooves 86 and downward therein to the circumferential groove 82, where further mixing occurs. The mixture then passes on down helical grooves 86 to the dispensing nozzle 64 and is dispensed through its passage 66. Concurrently, air is supplied through the air line 134 at a pressure of 100 psi to cause an air stream to issue from the annular orifice 70 surrounding the nozzle 64. The elastomer composition flowing from the nozzle is carried downward with the air stream and is deposited on the cleansed surface 39 of the tire 38. Deposits from this same dispensing head 50 may be made without the air stream, in which case the elastomer composition will flow by gravity and will form a pool 330 on the tire surface, as shown in dotted lines in FIG. 2. With the use of the air stream, a flattened pool 331 is formed which spreads outward as shown in full lines in FIG. 2, and its edges are feathered to reduce the discontinuity between the pool and the tire.

C. At the end of the preset dispensing time, the cycle control valve 152 is deactivated, which causes the air cylinder 150 to retract the slide 110 and turn the elastomer valve 95 and activator valve 97 to their recirculating positions as shown in FIGS. 3 and 5. This shuts off the supply of elastomer and activator to the mixing chamber and returns the supply circuits to recirculating condition. The mixer impeller is left running. There is then a delay of say five seconds during which the dispensing head is moved out of dispensing relation with the tire 38 and is disposed over the waste receptacle 58.

D. A flush and purge cycle is then initiated. The mixing impeller 74 remains on, and the solvent control air valve 174 is opened to supply air to open the solvent valve 166 (FIG. 6). Solvent is then delivered from the solvent tank 170 through the lines 168 and 162 to the inlet port 160 to the mixing chamber 62. Flushing flow continues for a period of say five seconds.

E. Flushing flow is then shut off by deactivating the control valve 174, and the air supply valve 164 is opened to supply air under pressure from the air line 154 through the line 162 to the inlet port 160 to the mixing chamber. Air flow is continued for say five seconds, to purge the mixing chamber and the impeller 74 and nozzle 64 of residual solvent. The purging air is then shut off and the impeller drive motor 75 de-energized. The system is then in standby or ready condition for a subsequent dispensing cycle, with the elastomer and activator supply circuits in recirculating condition and the pumps 118 and 144 continuing to operate to maintain recirculation.

The tire to which correcting elastomer has been added may be removed from the balance correcting machine promptly after completion of the dispensing deposit, and placed in a curing rack for a short time sufficient to permit curing to be completed. The urethane composition used is sufficiently viscous to permit such removal and is self-curing within less than 60 seconds.

Figure 8:
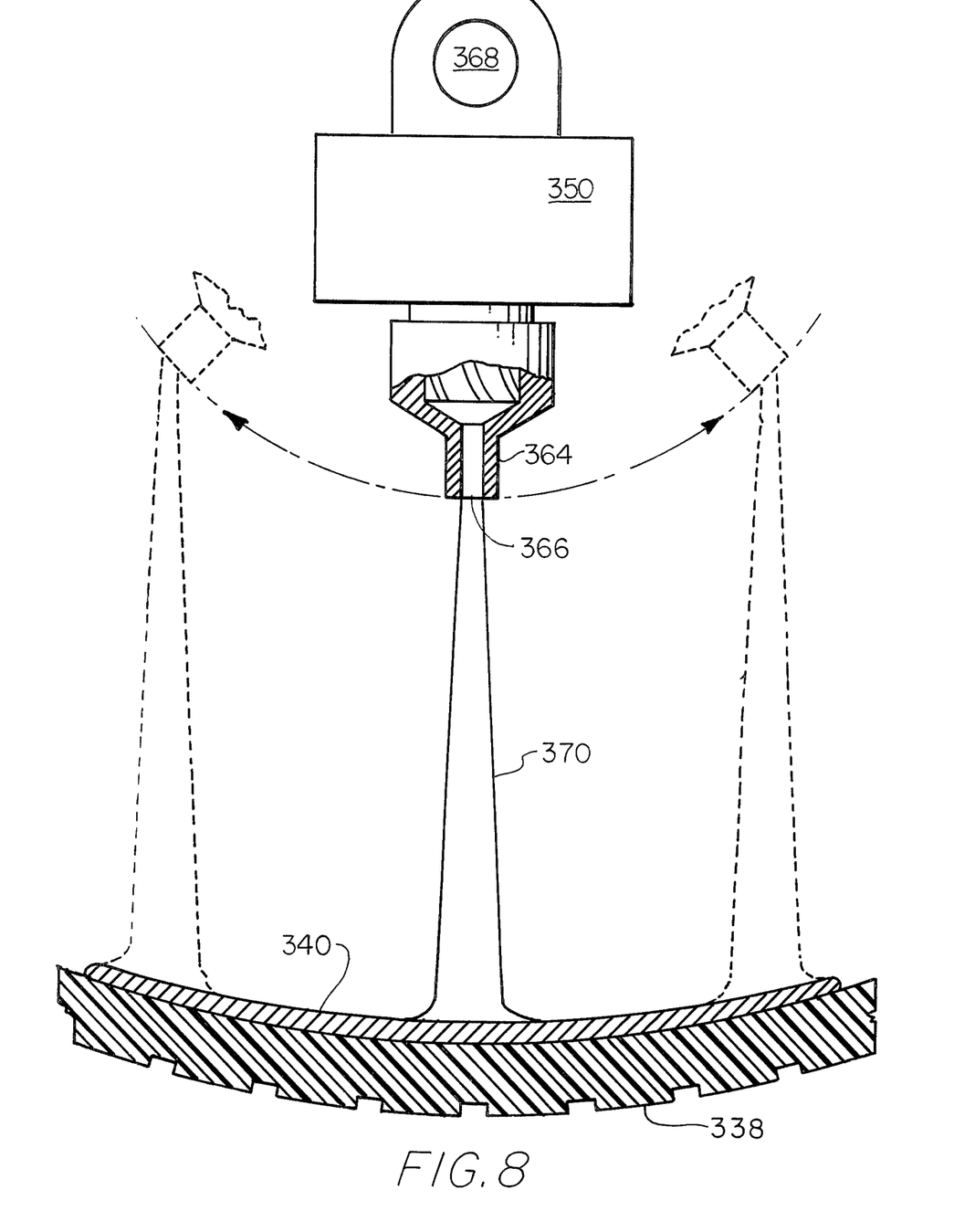
FIG. 8 is an elevation showing a head similar to that of FIG. 2, but with parts broken away to show a modified nozzle construction, and with the head mounted for arcuate movement to dispense correcting substance over an arc of the tire surface.

The dispensing head 350 shown in FIG. 8 is identical with that shown in FIG. 2 and is similarly connected with supply and control mechanism as shown in FIGS.

5 and 6, with two exceptions. The nozzle 364 is arranged for dispensing elastomer composition by gravity in a stream 370 from the nozzle 364, without the assistance of any air stream. Also, the head 350 is mounted for swinging movement about a support 368. As the stream 370 of elastomer composition flows from the nozzle passage 366 during the dispensing cycle, the dispensing head 350 is bodily swung through an arc as indicated in FIG. 8 so that the composition falls by gravity onto the surface of the tire 338 over an elongated arc. This forms an elongated pool 340 on the inner surface of the tire, and distributes the mass over that arc.

It is found that with the elastomer composition mentioned in the examples set forth above, the elastomer composition becomes sufficiently viscous and "set" when it is deposited on the tire surface that the elongated pool 340 remains substantially as such without excessive longitudinal flow so that the pool remains as an elongated pool. Such an elongated pool is especially desirable when relatively large quantities of tire correcting substance are required to correct the imbalance of the tire, for the elongated pool distributes the mass over a substantial arc and does not concentrate the relatively large mass at a single point on the tire wall.

I claim:

1. The method of correcting rotational imbalance of a pneumatic tire of elastomeric material which comprises determining the mass and angular location of the imbalance and preparing the inside surface of the tire to expose the bare elastomeric material of the tire at a balance-correcting position and depositing at the balance-correcting position on the inner surface of the tire a measured quantity of an uncured quick-curing mixture containing a liquid urethane elastomer and an activator therefor, which mixture will bond to the elastomeric material of the tire at such surfaces as it cures, the elastomer composition being dispensed in a stream toward the surface together with a stream of gas under pressure so as to spread the deposited material over an area of the surface and feather the edges of the deposited material, and curing the deposited composition in contact with such surface to form a balance-correcting mass bonded to such surface, the stream of gas under pressure surrounding the stream of elastomer composition.

2. The method of claim 1 wherein the preparing step includes treating the surface with an abrasive tool to expose the bare elastomeric material of the tire for receiving the deposited elastomer composition.

3. The method of claim 2 in which the quantity of elastomer composition is calculated both to add the mass of original imbalance and to replace mass removed by the surface-preparing step.

4. The method of claim 1 wherein the step of preparing the surface comprises washing the surface with a solvent.

5. The method of claim 1 in which the elastomer composition is deposited in an elongated pool on the tire.

6. Apparatus for correcting rotational imbalance in pneumatic tires, comprising means to support a tire in a balance-correcting position with the internal surface thereof adjacent its point of imbalance presented to receive a deposit of an uncured elastomer balance-correcting substance, a dispensing head movable between a retracted position and a dispensing position for dispensing balance-correcting substance on such internal surface of the tire adjacent its point of imbalance, said head being operable to dispense onto such internal surface a measured quantity of the uncured elastomer composition which bonds to the tire as it cures, together with a stream of a gas for smoothing the pool of elastomer substance thus formed, said head including a nozzle for discharging the elastomer and an enclosure surrounding the nozzle and defining an annular orifice about the nozzle for simultaneously discharging the gas, the stream of discharged gas surrounding the stream of discharged elastomer.

7. Apparatus as in claim 6 with the addition of mechanical means for supporting said head in and moving the same between said two positions.

8. Apparatus as in claim 7 in which said mechanical means is operative to move said head to a flushing position, a receptacle at such flushing position to receive the discharge from the head, and means to flush the head while in such flushing position so as to prepare it for a subsequent dispensing operation.

9. Apparatus as in claim 6 with the addition of a surface cleaning device movable between a retracted position and an operative position for cleaning the internal surface of the tire adjacent the point of imbalance of the tire.

10. Apparatus as in claim 9 in which said dispensing head and surface cleaning device are mounted on supports which are interconnected for coordinate movement so as to locate the dispensing head in retracted position when the cleaning device is in operative position and to locate said cleaning device in retracted position when said dispensing head is in dispensing position.

11. Apparatus as in claim 9 in which the dispensing head and cleaning device are mounted on a common carriage movable between two positions in one of which the cleaning device is in operative position and in the other of which the dispensing head is in dispensing position.

12. Apparatus as in claim 10 in which the coordinated supports are operative to dispose both the cleaning device and the dispensing head in clearance positions so as to permit free movement of tires to and from said balance-correcting position.

13. Apparatus as in claim 10 in which the supports for said device and said head include power-operated means for raising and lowering said device and head relative to the tire surface as the same are moved to and from their operative and dispensing positions, so as to position the same in operative relation with the internal surface of the tire tread wall and between the beads of the tire.

14. Apparatus as in claim 13 with the addition of means for conveying tires to and from said balance-correcting position, and in which said cleaning device and dispensing head are mounted on carriage means movable transversely of the path of said tire conveying means.

15. Apparatus as in claim 6 with the addition of means for presetting the mass of balance-correcting substance dispensed by said head in accordance with the mass of imbalance of the tire being balanced.

16. Apparatus as in claim 6 in which said dispensing head in its dispensing position and a tire in said balance-correcting position are relatively movable in the plane of the tire so as to distribute the mass of correcting substance circumferentially of the tire.

17. Apparatus for correcting rotational imbalance of a pneumatic tire comprising first means for detecting the location of rotational imbalance and the mass required to correct it, means for preparing an inner surface of the tire in the vicinity of the location of imbalance to receive a deposit of balance-correcting fluid comprising a liquid elastomer and a catalyst, means for dispensing onto such prepared surface a mass of balance-correcting fluid substantially equal to the mass required to correct the imbalance, the dispensed fluid forming a pool, and means for dispensing a stream of gas together with said balance-correcting fluid to cause the outer edge of said pool to be smoothed to decrease the discontinuity at said edge between said pool and said tire inner surface, which fluid cures to an elastomer and adheres to the prepared surface to correct the imbalance, the fluid comprising a quick-curing mixture of a liquid urethane elastomer and an activator therefor.

18. Apparatus according to claim 17 wherein said dispensing means comprises a nozzle for dispensing said correcting fluid and an annular orifice for directing said gas onto said pool, said annular orifice being disposed about said nozzle.

19. Apparatus according to claim 18 wherein the first means include means for determining the mass of original imbalance and for determining the mass of material removed from the article during the preparation of the surface of the article in the vicinity of the location of imbalance, the dispensing means dispensing a mass equal to the sum of the mass of original imbalance and the mass of material removed during preparation.

20. Apparatus according to claim 18 and further comprising means for moving said dispensing means along said tire inner surface in the vicinity of said point of imbalance so as to distribute the elastomer mixture over an area of said prepared surface.

* * * * *